United States Patent [19]

Quate et al.

[11] 3,826,866
[45] July 30, 1974

[54] METHOD AND SYSTEM FOR ACOUSTO-ELECTRIC SCANNING

[75] Inventors: Calvin F. Quate, Los Altos Hills; Oberdan W. Otto, Mountain View; Nicolas J. Moll, Palo Alto, all of Calif.

[73] Assignee: Board of Trustees of Leland Stanford Junior University, Stanford, Calif.

[22] Filed: Apr. 16, 1973

[21] Appl. No.: 351,237

[52] U.S. Cl. .................................. 178/7.1, 178/7.6
[51] Int. Cl. .................................. H04n 5/30
[58] Field of Search .................................. 178/7.1, 7.6

[56] References Cited

UNITED STATES PATENTS

| | | | |
|---|---|---|---|
| 3,555,180 | 1/1971 | Cook | 178/7.1 |
| 3,617,931 | 11/1971 | Pinnow et al. | 178/7.6 |
| 3,633,996 | 1/1972 | Lean et al. | 178/7.6 |
| 3,746,867 | 7/1973 | Phela et al. | 178/7.1 |

*Primary Examiner*—Richard Murray
*Attorney, Agent, or Firm*—Flehr, Hohback, Test, Albritton & Herbert

[57] ABSTRACT

A method and system for scanning an energetic image to convert the information in the energetic image into an electrical signal. A semiconductor has an electrical field applied thereto to increase the average depletion layer width of the semiconductor by charging the semiconductor surface states. The energetic image is impinged upon the semiconductor and begins discharging the surface states in accordance with intensity variations in the image to produce depletion layer with variations. A piezoelectric substrate is situated adjacent to the semiconductor. A reading acoustic surface wave is propagated along the piezoelectric substrate along one dimension of the semiconductor. The amplitude of the reading wave is modulated by the depletion layer width perturbations of the semiconductor so that an output acoustic wave is formed. The output acoustic wave is converted to an electrical signal having amplitude variations corresponding to the depletion layer width perturbations of the semiconductor. In accordance with one embodiment of the invention two dimensional scanning of the semiconductor is achieved through propagating a plurality of reading acoustic surface waves differing in frequency from each other and spaced from each other along a second dimension of the semiconductor film.

16 Claims, 5 Drawing Figures

METHOD AND SYSTEM FOR ACOUSTO-ELECTRIC SCANNING

CROSS REFERENCE TO RELATED APPLICATIONS

This invention is an improvement on an invention described in an application entitled Method and System for Acousto-Electric Scanning, Ser. No. 351,272 filed 04/16/73 and which is assigned to the assignee of this invention.

BACKGROUND OF THE INVENTION

This invention relates to a method and system for scanning an energetic image to convert the information in the energetic image into an electrical signal.

There are three general types of acoustic waves. The simplest type is a longitudinal wave, in which the material through which the wave is travelling is alternately compressed and expanded. A second type of acoustic wave is the transfer or shear wave in which the material particles vibrate from side to side at right angles to the direction of travel of the acoustic wave. A third type of acoustic wave, the acoustic surface wave, exists only near the free surface of a solid and is a composite wave incorporating both shear and longitudinal components.

The first acoustic devices employed in electronic applications made use of either longitudinal or shear waves that pass through the interior of a solid material. An advantage provided by acoustic surface waves are that the waves can be easily excited anywhere on the surface of a material and collected elsewhere on the surface. Various electronic devices have been constructed which utilize acoustic surface waves. Among such devices are acoustic filters and delay lines, for example.

It has been known for some time that an acoustic surface wave propagating beneath a spaced semiconductor will experience attenuation due to acousto-electrical coupling between the piezoelectric medium supporting the wave and the semiconductor. This effect has previously been utilized for an amplifier and also for filtering. For example, amplification may be obtained by allowing the electric field associated with the acoustic surface wave to interact with moving electrons. If an electron is travelling faster than the wave, there is a tendency for the electron to slow down and deliver some of its energy to the wave and hence increase the amplitude of the wave. If, on the other hand, an electron is moving more slowly than the wave, the reverse is true. The wave speeds up the electron and in the process of delivering energy to the electron the acoustic surface wave decreases in amplitude.

There is disclosed and claimed in a copending application entitled Method and System for Acousto-Electro Scanning, Ser. No. 351,272 filed 04/16/73, and assigned to the assignee of the present invention, an invention in which an energetic image such as an optical pattern is scanned and converted into an electrical signal through the use of acoustic surface waves. Specifically, the image is impinged upon a semiconductor in which it produces conductivity perturbations through carrier generation. A piezoelectric substrate is situated adjacent to the semiconductor film. A reading acoustic surface wave is propagated in one direction past the semiconductor film and a scanning acoustic surface wave is propagated in the opposite direction. The amplitude of the reading wave is modulated by the scanning wave as the two pass each other in accordance with the conductivity perturbations in the semiconductor film to form a modulated output acoustic surface wave which is converted into an electrical signal.

OBJECTS AND SUMMARY OF THE INVENTION

It is an object of this invention to convert an energetic image into an electrical signal through impinging the image on a semiconductor film where it produces perturbations in the depletion layer width of the semiconductor film, and scanning these perturbations through use of an acoustic wave.

It is another object of this invention to two dimensionally scan such depletion layer width perturbations by propagating a plurality of reading acoustic surface waves parallel to each other along one dimension of the semiconductor film but spaced with respect to each other along another dimension of the semiconductor film.

Briefly, in accordance with one embodiment of the invention, a semiconductor has an electrical field applied thereto to charge the surface states thereof so that the average width of the semiconductor depletion layer width is increased. Subsequently, the energetic image impinging upon the semiconductor starts to discharge the surface states which causes perturbations in the depletion layer width in accordance with the information contained in the energetic image. A reading acoustic surface wave propagated past the semiconductor is modulated in accordance with the depletion layer width perturbations to form an output acoustic surface wave.

DESCRIPTION OF THE PREFERRED EMBODIMENTS

Figure 2:
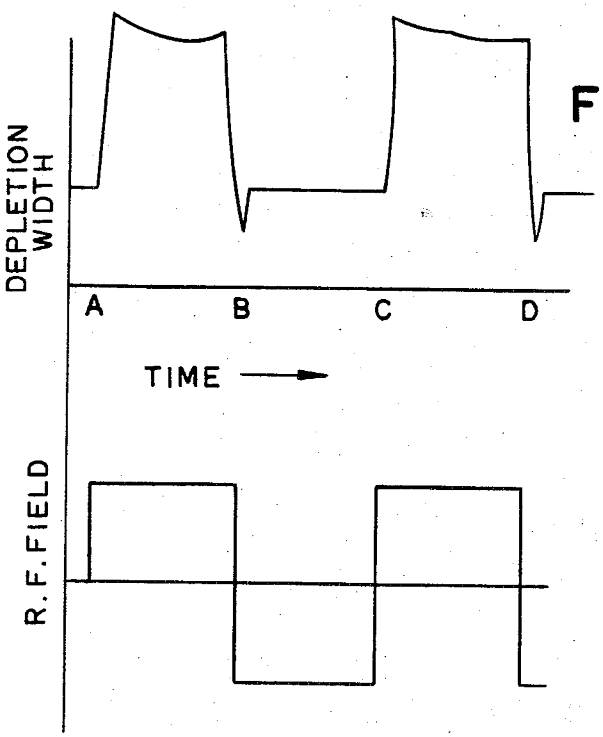
FIG. 2 is a wave diagram illustrating the manner in which the average depletion layer width of a semiconductor film is increased by application of an alternating electrical field thereto.

It is well established that the propagation constant, $\beta$, of a pizeoelectric surface wave is perturbed by the presence of a conducting medium near the surface, thus resulting in a change in phase velocity and in attenuation of the wave. The perturbation for a given semiconductor-piezoelectric system is determined by the conductivity, and the spacing from the piezoelectric, of the semiconductor. The thickness of the semiconductor is also important when it is smaller than $1/\beta$. As known to those skilled in the art, properly prepared semiconductors are capable of exhibiting surface states under the influence of an electrical field, in which charge is trapped at the surface of the semiconductor, forming a depletion layer. If charge is trapped at the surface of the semiconductor, the surface is depleted of mobile charge to an extent determined by the concentration of the trapped charge. An energetic image impinging on the semiconductor surface discharges the surface traps in proportion to the incident intensity. Thus the depletion at the surface varies spatially according to the intensity of the image.

As discussed before, there is disclosed and claimed in a copending application entitled Method and System for Acousto-Electric Scanning, Ser. No. 351,272, filed 04/16/73 and assigned to the assignee of the present invention, a technique for scanning an energetic image using a semiconductor and acoustic surface waves in which conductivity perturbations are produced in the semiconductor by carrier generation or photoconductivity. It has been found, however, in accordance with this invention, that modulation of an acoustic wave propageted in the vicinity of a semiconductor depends not only on the bulk conductivity of the semiconductor, but also on the spacing of the charge carriers from the acoustic line. That is, by employing surface states the depletion layer of a semiconductor can be modulated by an energetic image to produce a resulting modulation of an acoustic wave propagating in the vicinity of the semiconductor.

It can be demonstrated that a scanning technique utilizing depletion layer width perturbations is more sensitive to the energetic image intensity than modulation of the bulk semiconductor conductivity.

A sensitivity parameter Q can be defined as follows:

1. $Q = \delta\alpha/\delta\phi$ where $\alpha$ is the attenuation/cm. of the acoustic wave and $\phi$ is the number of photons /cm$^2$-sec. absorbed by the semiconductor. Comparing the two imaging techniques, photoconductive (pc) and surface state discharge (ss)

2. $Qpc = (\delta\alpha/\delta\sigma)\ \delta\sigma/\delta\phi$

3. $Qss = (\delta\alpha/\delta W\ \delta W/\delta\phi$ where $\sigma$ is the semiconductor bulk conductivity and W is the depletion region width. Now, $\sigma(\delta\alpha/\delta\sigma)$ and W $\delta\alpha/\delta W$) are roughly of the same order of magnitude; the same relative changes in $\sigma$ and W produce roughly the same change in attenuation. Then, 4. $Qpc = \sigma(\delta\alpha/\delta\sigma)\quad \tau_n/N_D L$ 5. $Qss = W(\delta\alpha/\delta W)\quad \tau_s/N_D W$ where $\tau_n$ is the majority carrier lifetime, $N_D$ is the donor concentration, L is the semiconductor film thickness, $\tau_s$ is the time between the charging event and the reading event (which must be shorter than the dark decay time), and W is the depletion width. Since $L >> W$ and $\tau_s >> \tau_n$, equations (4) and (5) show that the surface state or depletion width modulation technique is a far more sensitive technique.

The depletion variations in a semiconductor are scanned by initiating a "charging event". A charging event is any event which charges the surface states of the semiconductor to a uniformly high level. Surface states are charged in excess of the equilibrium level by applying a potential across the semiconductor which drives mobile charge carriers to the surface. The degree to which the surface states are initially charged is determined by 6. $N_{so} = \epsilon E_o/q$ where $E_o$ is the peak value of the field outside the semiconductor, $\epsilon$ is the permittivity of the semiconductor, $q$ is the electronic charge, and $N_{so}$ is the concentration of trapped surface charge. If the field is immediately removed, then $-\epsilon E_o$ is simply the built-in electric displacement at the surface associated with the depletion caused by the trapped surface charge. After the electric field is removed the trapped surface charge or surface states begin discharging at a rate dependent upon the intensity of the energetic image, producing depletion layer width perturbations. If the risetime for the applied potential is not substantially shorter than the surface state lifetime, the surface states will not be charged to a uniform level and the charging level will depend on the illumination level. Assuming that the risetime of the applied potential is short compared to the surface state lifetime, any information (externally induced by the energetic image) which existed before the charging event in the form of depletion width variations is erased, provided that the applied potential is sufficiently large.

The field in a charging event may have one of several forms. It may be a fast risetime, single polarity field which drives majority carriers to the surface; it may be an alternating field whose period is short compared to the surface state lifetime; or it may be the alternating field of a piezoelectric acoustic wave. In the last case the semiconductor is charged sequentially along the acoustic path whereas in the first two the entire semiconductor is charged simultaneously. Furthermore, the field may be short or long duration. If it is short duration, the attenuation coefficient after the charging event is determined by the depleted condition of the semiconductor. If the field is long duration the attenuation is determined by the average charge distribution created by the field.

In general, the perturbed behaviour of an acoustic wave propagating along the $+z$ direction is given by 7. $S_1(\tau) = S_{10}(\tau) \exp\{-i \int dz \Delta\beta(z,t)\}$ where $S_{10}$ and $S_1$ are the unperturbed and perturbed amplitudes of the wave, $\Delta\beta(z, t)$ is the perturbation in the propagation coefficient and $\tau = t - (z/v)$ gives the location of an unperturbed wave front. The integration is performed with respect to $\tau$ constant. The attenuation coefficient is minus the imaginary part of $\beta$. The form of the scanned output is the integral of the perturbation in the propagation coefficient $$\int_{z_o} dz \Delta\beta(z) \quad (8)$$

where $\Delta\beta(z)$ is the change in the propagation coefficient at the point $z$ along the acoustic path caused by the charging event, and $z_o = -v\tau$ for a single polarity field or an alternating field applied directly across the semiconductor layer or $z_o = -(\frac{1}{2})\ v\tau$ for an oppositely propagatinc acoustic wave.

The equilibrium depletion width variations present with an incident energetic image can be scanned by initiating a charging event, thus "erasing" the information present before the charging event. Because they are long-lived, the surface states remain charged after the electric field is removed during the transit of the acoustic wave under the semiconductor (about 3$\mu$s/cm). Each point along the acoustic wave integrates the attenuation coefficient which varies with the depletion width variations along the acoustic path. The point emerging from the interacting region just as the surface states are charged at that end does not integrate over any erased section. The point on the wave entering the opposite end of the interaction region at the time the surface states at that end are charged integrates over a completely erased interaction region. Points in between integrate over a region partially erased. This is the way the integrating scan is accomplished.

If the scan is performed shortly after a charging event, more sensitivity and larger dynamic range are available than for scanning when the energetic image and the semiconductor are in equilibrium. Thus the better scanning technique is to precharge the surface states, wait for a "short" time $\tau$, then scan by charging the surface states once again. During the time $\tau$ the illuminating regions discharge the surface states at a rate proportional to the incident intensity, the unilluminated regions discharging hardly at all. The resulting depletion width variation are substantially larger than the equilibrium configuration. If the time $\tau$ is equal to the relaxation time associated with the brightest part of the image, optimal sensitivity over the full dynamic range of the image is attained. If higher sensitivity is desired at the lower illumination levels, $\tau$ may be increased, sacrificing dynamic range.

Figure 1:
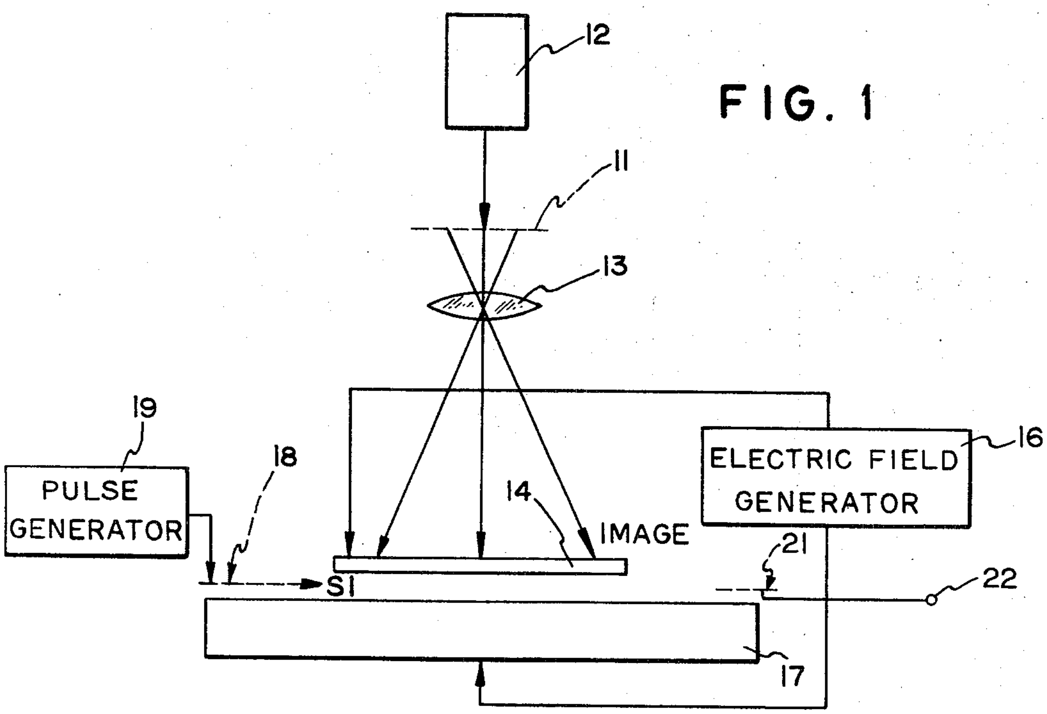
FIG. 1 is a schematic diagram of apparatus in accordance with this invention for converting an energetic image on a semiconductor film into an electrical signal.

Turning now to a consideration of FIG. 1, there is shown a schematic diagram of one embodiment of apparatus in accordance with this invention. An object 11 is illuminated by means such as light source 12 so that an image of the object is formed by means such as lens system 13 on a semiconductor 14. Means are provided such as electric field generator 16 for applying an electrical field to the semiconductor 16 in order to charge the surface states thereof to a uniformly high level and increase its depletion width. Situated adjacent to the semiconductor 14 is a pizeoelectric substrate 17. In accordance with one embodiment of the invention the semiconductor 14 has a thickness of approximately 2.5 um and the spacing between the semiconductor 14 and the top surface of the piezoelectric substrate 17 is on the order of 1,000 A. Also in accordance with this one particular example, the piezoelectric substrate is comprised of $LiNbO_3$.

An input electrode 18 is provided at one end of the piezoelectric substrate driven by a pulse generator 19 for generating an acoustic surface wave which may be termed a reading wave. This reading acoustic wave $S_1$ is propagated toward the right past the semiconductor 14 as indicated by the arrow in FIG. 1. An output electrode 21 is provided at the end of the piezoelectric substrate 17 opposite where the reading pulse is generated to detect the output acoustic wave which is the reading pulse modulated in accordance with the depletion width perturbations of the semiconductor 14. The output electrode is connected to an output terminal 22.

In operation, the electric field generator 16 applies an electrical field across the semiconductor 14. As mentioned before, this electrical field may be a fast rise time, single polarity field which drives majority carriers to the surface to uniformly charge the surface states resulting in a uniform depletion width. Alternatively, the electrical field may be an alternating field whose period is short compared to the surface state lifetime. To illustrate the charging effect for an alternating electrical field, assume for example the specific case of an n-type semiconductor with a large number of acceptor type surface states. When the semiconductor is in thermal equilibrium and there is no external field, the Fermi level is fixed at the surface state energy. If a short pulse of electric field is then applied with the field pointing out of the semiconductor, the depletion width increases by an amount depending on the applied field. This is illustrated in FIG. 2 as occurring at time A. As further illustrated in FIG. 2, the depletion layer then relaxes toward its thermal equilibrium value as the filled surface states are discharged by other thermally generated holes. When the field is removed (time B) the depletion width returns nearly to its thermal equilibrium value. Next, also at time B, a short pulse of electric field is applied pointing into the semiconductor. As shown in FIG. 2, the depletion width instantaneously decreases. Empty surface states are rapidly filled by majority carriers which are diffusing across the depletion region. Thus, the depletion region rapidly relaxes to its equilibrium width. When the field is reversed (time C) the depletion width increases again to the magnitude it had before and then slowly decreases towards its equilibrium value. From an inspection of FIG. 2 it is clear that with an alternating electric field applied to the semiconductor, after a few cycles the average depletion width is increased by charging of the surface states.

Thus with either a single polarity electrical field or an alternating electrical field applied to the semiconductor 14, the surface states thereof become charged to a uniform value so that the depletion layer width of the semiconductor is uniform along its extent. Thereafter, after the electrical field is removed, the surface states begin to discharge as a result of the energetic image impinging on the semiconductor surface. The surface states discharge at a rate dependent upon the intensity of the energetic image, with this discharging causing depletion layer width perturbations. This discharging of the surface states (or depletion layer width perturbation) produces a corresponding modulation of the acoustic reading wave $S_1$ propagating past the semiconductor, by perturbing the propagation or attenuation coefficient of the acoustic wave $S_1$. As previously explained, each point along the acoustic reading wave $S_1$ integrates the attenuation coefficient along the acoustic path. The point on the acoustic wave emerging from the interaction region just as the surface states are charged and the electric field removed does not integrate along the extent of the semiconductor. The point on the acoustic wave entering the opposite end of the interaction region at the time the surface states at that end are charged and the electric field removed integrates over the entire length of the semiconductor. Points in between on the acoustic wave integrate over a portion of the semiconductor. The form of the scanned output at output terminal 22 is thus the integral of the perturbation in the propagation coefficient as previously defined. If desired, the integrated output at output terminal 22 can be processed through differentiating circuit to produce a signal modulated in accordance with the perturbations in the propagation coefficient along the length of the semiconductor and hence in accordance with the intensity of the energetic image impinging on the semiconductor.

Figure 3:
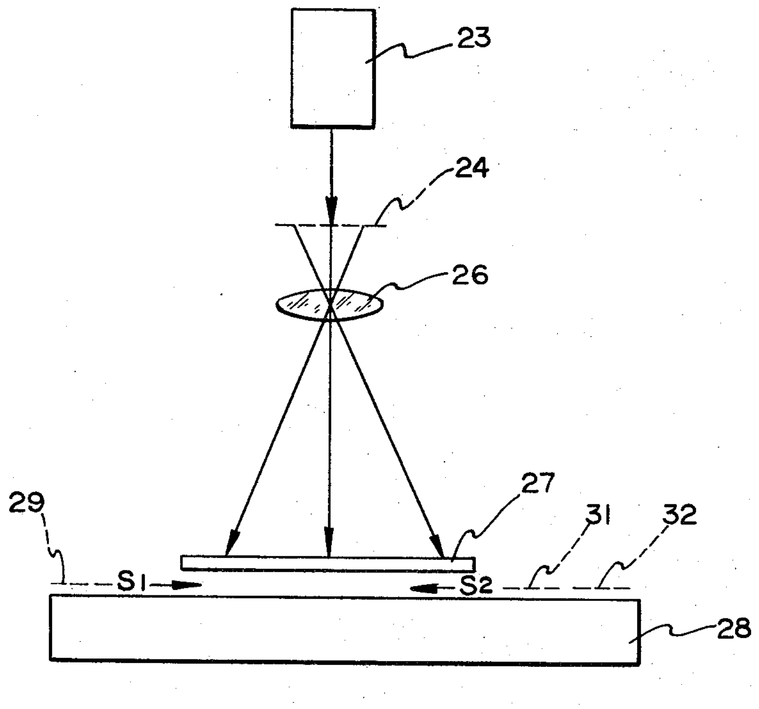
FIG. 3 is a schematic diagram of an alternate system for converting an energetic image on a semiconductor into an electrical signal.

FIG. 3 shows another embodiment of the invention in which no external electric field generator is required. In FIG. 3 a source of light 23 illuminates an object 24 which is imaged by a lens 26 on a semiconductor 27. Adjacent to the semiconductor 27 is a piezoelectric substrate 28. The piezoelectric substrate 28 has an input electrode 29 provided at one end thereof for generating an acoustic surface wave which may be termed a reading wave. This reading acoustic wave $S_1$ is propagated towards the right past the semiconductor 27 as indicated in FIG. 3. Another input electrode 31 is provided on the top surface of the piezoelectric substrate 28 for propagating an acoustic wave 52 which may be termed a scanning pulse. This scanning pulse is propagated to the left as shown by the arrow in FIG. 3 past the semiconductor 27. An output electrode 32 is also provided on the piezoelectric substrate 28 for converting an output acoustic wave into an electrical signal.

The scanning pulse 52 has an associated transverse electric field which is of sufficient magnitude (on the order of a kilovolt per cm.) to charge the surface states of the semiconductor. As the scanning pulse starts propagating to the left it first overlaps the leading edge of the reading acoustic wave and charges the surface states of the semiconductor portion past which it is travelling. As the scanning pulse continues to propagate to the left it thus sequentially charges the surface states of successive portions of the semiconductor. The surface states of these successive portions of the semiconductor begin to discharge in turn due to the incident energetic image. The depletion layer width of the semiconductor is thus perturbed or modulated by the energetic image, with a corresponding perturbation or modulation of the attenuation or propagation coefficient for the reading acoustic wave $S_1$. The modulated output acoustic wave is then converted into an electrical signal by the output electrode 32. As before, the output acoustic wave is in the form of the integral of the perturbation in the propagation coefficient. The primary difference between this technique and that discussed in connection with FIG. 2 is that in this technique the surface states are sequentially charged by the electric field of a scanning acoustic pulse rather than being charged all at one time by application of an external electric field.

Figure 4:
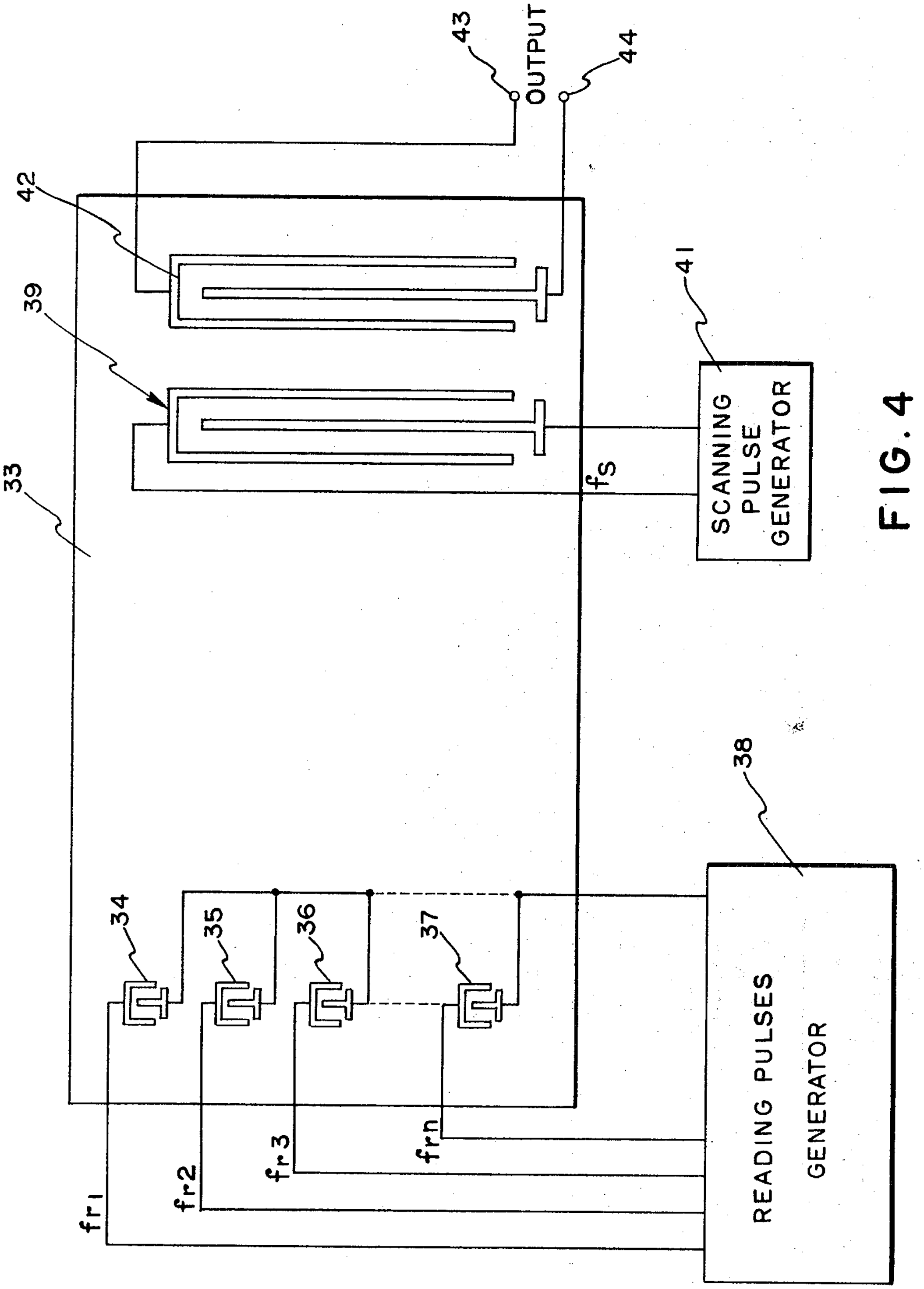
FIG. 4 is a top plan view of a piezoelectric substrate in accordance with one embodiment of the invention in which a plurality of reading acoustic surface waves are generated for two dimensionally scanning an energetic image on a semiconductor film.

Referring now to FIG. 4, there is shown a top plan view of a piezoelectric substrate 33 in accordance with one embodiment of the invention which is arranged for two-dimensional scanning of a semiconductor. In FIG. 4 a plurality of electrodes 34 through 37 are provided which are spaced with respect to each other along one dimension of the piezoelectric substrate 33 and hence along one dimension of any semiconductor film to which the piezoelectric substrate 33 is adjacent. Only four electrodes 34 through 37 are shown in FIG. 4 but it should be understood that more or less than four electrodes may be provided. The electrodes shown in FIG. 4 are of the interdigitated transducer type and function to convert an electrical signal into an acoustic surface wave. These elctrodes 34 through 37 are driven by signals from a reading pulse generator 38 and each of the electrodes in response to a pulse from the reading pulse generator 38 generates a reading acoustic surface wave which is propagated along the piezoelectric substrate 33 in a direction perpendicular to the spacing between these electrodes.

An elongated interdigitated electrode or transducer 39 is provided for generating a scanning acoustic surface wave in response to a signal input from a scanning pulse generator 41. Another elongated interdigitated type electrode or transducer 42 is provided on the piezoelectric substrate 33 and has electrical connections to output terminals 43 and 44. The output electrode or transducer 42 functions to detect vibrations in the piezoelectric substrate 33 corresponding to the amplitude modulated reading pulse and generate an electrical signal proportional thereto across the output electrodes 43 and 44.

Utilizing an arrangement such as shown in FIG. 4, two dimensional scanning of a semiconductor film adjacent to the piezoelectric substrate 33 may be accomplished. This may be accomplished in any of several ways. For example, reading pulses may be successively generated by the electrodes 34 through 37 with appropriate scanning pulses being generated by the scanning pulse electrode or transducer 39, so that electrical signals appear at the output terminals 43 and 44. These electrical signals respectively correspond to the modulated reading waves which are in turn proportional to depletion width variations across the semiconductor film in one dimension thereof. The successive scans are indicative of depletion width perturbations along this same dimension but displaced with respect to a second dimension of the semiconductor. Thus, in accordance with this embodiment the scanning pulse generator 41 is adapted to sequentially supply pulses to the electrodes 34 through 37 for sequentially generating reading surface acoustic waves.

If desired, the frequency or pulse width of the pulses applied to the electrodes 34 through 37 may be of different frequency so that the modulated electrical signals appearing at the output electrodes 43 and 44 are also of different frequency. This facilitates sorting out of the electrical signals as to which electrical signal corresponds to which scan. Alternatively, and in accordance with still another embodiment, electrical pulses differing in frequency from each other may be simultaneously applied to the reading wave electrodes or transducers 34 through 37 so that a plurality of reading acoustic surface waves differing in frequency from each other are simultaneously generated. This plurality of reading acoustic surface waves then, as discussed before, interact with the scanning acoustic surface waves generated by the electrode or transducer 39 so that a plurality of modulated acoustic surface waves differing in frequency from each other are received by the transducer or electrode 42 and converted into electrical signals at the output terminals 43 and 44. An appropriate tunable receiving device can then be connected to the output electrodes 43 and 44 and merely by tuning the receiver to an appropriate frequency any one of the modulated output acoustic surface waves can be detected. By sequentially tuning this appropriate receiver to the various frequencies of the plurality of modulated output acoustic surface waves, a two-dimensional scan of depletion layer width perturbations in a semiconductor film adjacent to the piezoelectric substrate 33 is generated.

Figure 5:
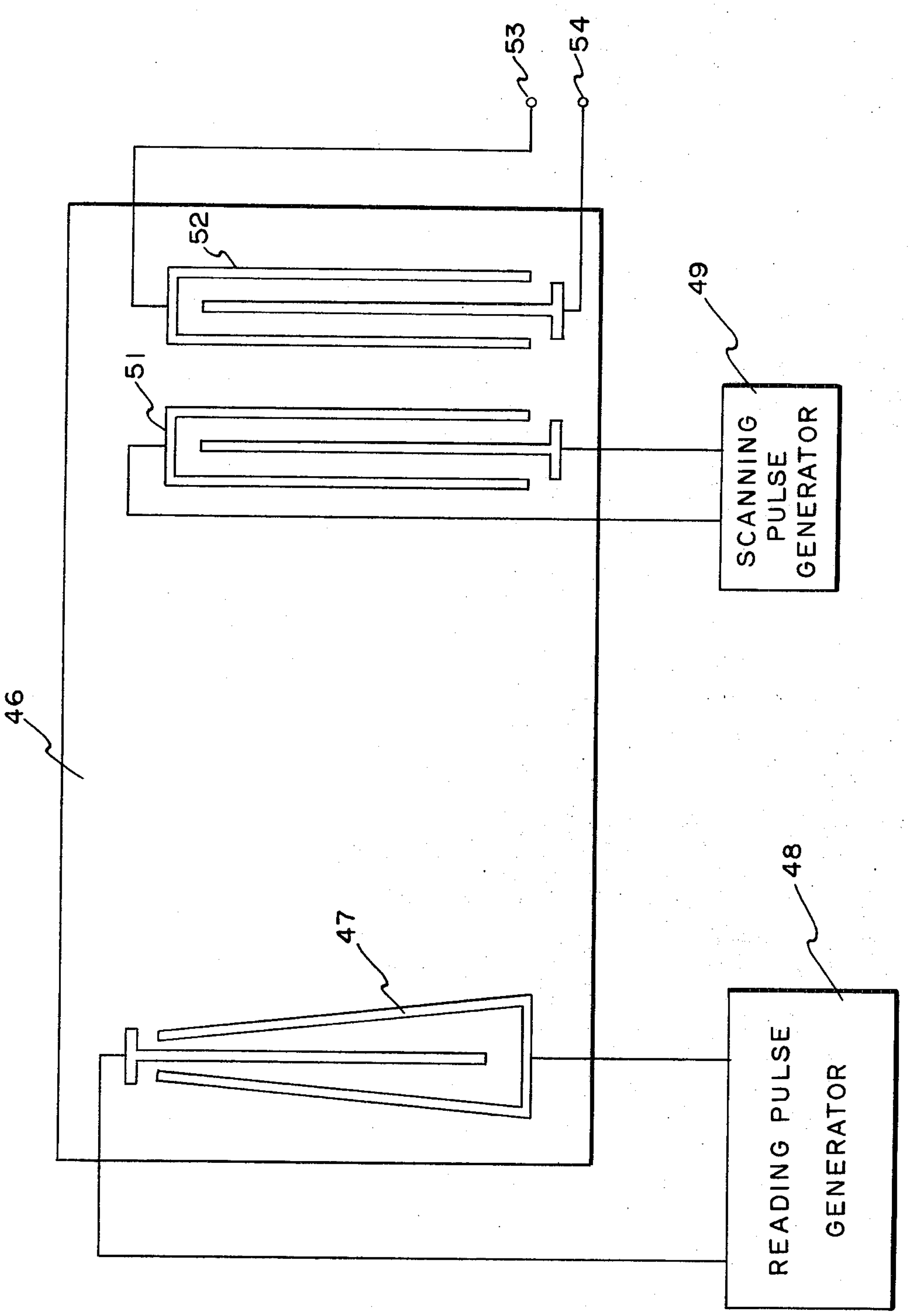
FIG. 5 is a top plan view similar to FIG. 4 but showing a two dimensional scanning system using one reading wave electrode of varying width.

Alternatively, and as illustrated in FIG. 5 a piezoelectric substrate 46 can have a single interdigitated reading wave electrode 47 driven by a frequency source 48. As before, a scanning pulse generator 49, scanning pulse electrode 51, output electrode 52 and output terminals 53 and 54 are provided and perform the same function as in the embodiment shown in FIG. 4. In the embodiment of FIG. 5 the reading wave electrode has a varying width along the dimension of the piezoelectric substrate 46 perpendicular to the dimension along which the reading waves are propagated. The reading pulse generator 48 in accordance with this embodiment generates a sweep frequency, such as a chirp signal, for driving the electrode 47. The frequency variation of the chirp signal corresponds to the width variation of the electrode 47 so that as the frequency of the signal driving the electrode 47 varies, the portion of the electrode which is excited to generate a reading acoustic wave varies. Thus with electrode 47 driven by a chirp signal, a succession of reading acoustic waves are generated and propagated as the various portions of electrode 47 are excited by the chirp signal. The succession of reading acoustic waves are modulated in accordance with the principles of this invention and converted to a succession of modulated electrical signals by output electrode 52. The succession of modulated electrical signals are a two dimensional scan of either conductivity perturbations due to carrier generation or depletion layer width variation in a semiconductor adjacent the piezoelectric substrates caused by an energetic image impinging thereon.

Thus what has been described is a method and apparatus for scanning an energetic image by impinging the image on a semiconductor. The surface states of the semiconductor are uniformly charged, and then the energetic image starts to discharge them in accordance with its intensity causing depletion layer width perturbations in the semiconductor. These depletion layer width perturbations produce corresponding perturbations in the attenuation or propagation coefficient of a reading acoustic wave propagated past the semiconductor. Utilizing an appropriate semiconductor, not only visible images but infrared images, for example, can produce such depletion layer width perturbations. Further, the scanning system and method of this invention can be applied for scanning any kind of energy distribution which produces perturbations in the photoconductivity or depletion layer width of a semiconductor. For example, if an acoustic signal is impinged upon a piezoelectric substrate adjacent a semiconductor, the electric field associated with the acoustic signal developed in the piezoelectric substrate produces perturbations in the depletion layer width of the semiconductor. These depletion layer width perturbations can be scanned according to the principles of this invention. Therefore, although the invention has been discussed with respect to specific embodiments with illustrative examples given by way of specific materials and dimensions, it should be appreciated that various modifications may be made to the specific embodiments without departing from the true spirit and scope of the invention.

We claim:

1. A method of scanning an energetic image to convert the information present therein into an electrical signal comprising the steps of charging the surface states of a semiconductor to produce a relatively uniform depletion layer along the semiconductor, impinging the energetic image on the semiconductor whereby perturbations are produced in the depletion layer as the surface states begin to discharge at a rate dependent upon the intensity of the energetic image, propagating a reading acoustic wave in the vicinity of the semiconductor in one direction past the semiconductor with the depletion layer width perturbations producing corresponding propagation coefficient perturbations of the reading acoustic wave to form an output acoustic wave which is modulated in accordance with the depletion layer width perturbations in the semiconductor, and converting the output acoustic wave into an electrical signal.

2. A method in accordance with claim 1 in which the semiconductor surface states are charged by application of an electrical field across the semiconductor.

3. A method in accordance with claim 2 in which the electric field is simultaneously applied along the extent of the semiconductor.

4. A method in accordance with claim 3 in which a single polarity electrical field is applied along the extent of the semiconductor and then removed so that the surface states can then begin to discharge in accordance with the intensity of the energetic image.

5. A method in accordance with claim 3 in which an alternating polarity electrical field is applied along the extent of the semiconductor and then removed so that the surface states can then begin to discharge in accordance with the intensity of the energetic image.

6. A method in accordance with claim 1 wherein the step of charging the surface states of the semiconductor comprises propagating a scanning acoustic wave pulse in a second direction past the semiconductor opposite the one direction whereby the electric field associated with the scanning acoustic wave pulse sequentially charges the surface states along the extent of the semiconductor.

7. A method in accordance with claim 1 including the steps of generating a plurality of reading acoustic waves, said plurality of reading acoustic waves being propagated past the semiconductor parallel to each other along the extent of the semiconductor in one dimension but being spaced from each other along a second dimension of the semiconductor to form a plurality of modulated output acoustic waves, and converting the plurality of output acoustic waves into electrical signals whereby a two dimensional scan of depletion layer width perturbations in the semiconductor due to the energetic image is achieved.

8. A method in accordance with claim 7 wherein the plurality of reading acoustic waves are each of a different frequency one from the other.

9. Apparatus for converting an energetic image into an electrical signal comprising a semiconductor, means for applying an electrical field to said semiconductor for charging the surface states thereof to produce a relatively uniform depletion layer width, means for imaging the energetic image on said semiconductor whereby perturbations appear in the depletion layer width in accordance with information present in the energetic image, a piezoelectric substrate adjacent to said semiconductor, means for propagating a reading acoustic wave along said piezoelectirc substrate in one direction with the depletion layer width perturbations producing corresponding propagation coefficient perturbations of the reading acoustic wave to form a modulated output acoustic wave, and means for converting said modulated output acoustic wave into an electrical signal.

10. Apparatus in accordance with claim 9 wherein said means for applying an electrical field to said semiconductor comprises an electric field generator coupled across said semiconductor.

11. Apparatus in accordance with claim 9 wherein said means for applying an electric field to said semiconductor comprises means for propagating a scanning acoustic wave along said piezoelectric substrate in a second direction opposite to the one direction, with the electric field associated with said scanning acoustic wave sequentially charging the surface states of said semiconductor along its extent.

12. Apparatus in accordance with claim 9 wherein said means for propagating a reading acoustic wave includes an interdigitated electrode disposed on said piezoelectric substrate.

13. Apparatus in accordance with claim 9 including means for propagating a plurality of reading acoustic waves, said plurality of reading acoustic waves being propagated parallel to one another along one dimension of said semiconductor but spaced with respect to one another along a second dimension of said semiconductor.

14. Apparatus in accordance with claim 13 wherein said means for propagating a plurality of reading acoustic waves comprises a plurality of interdigitated electrodes on said piezoelectric substrate spaced with respect to each other along the second dimension of said semiconductor.

15. Apparatus in accordance with claim 13 wherein said means for propagating a plurality of reading acoustic waves comprises a single interdigitated electrode disposed on said piezoelectric substrate, said single interdigitated electrode having a varying width along the second dimension of said semiconductor, and including a signal source of varying frequency for driving said single interdigitated electrode wherein different width portions of said single interdigitated electrode are responsive to different frequencies of said signal source of varying frequency for propagating a plurality of reading acoustic waves of corresponding different frequencies.

16. A method for scanning a pattern of energy distribution capable of causing depletion width variations in a semiconductor comprising the steps of charging the surface states of the semiconductor to produce a relatively uniform depletion layer width along the semiconductor, exposing the semiconductor to the pattern of energy distribution whereby corresponding perturbations appear in the depletion layer of the semiconductor, propagating a reading acoustic wave past the semiconductor so that the depletion layer perturbations cause corresponding propagation coefficient perturbations of the reading acoustic wave to form an output acoustic wave modulated in accordance with the depletion layer perturbations in the semiconductor, and converting the output acoustic wave into an electrical signal.

* * * * *